United States Patent
Grosskinsky et al.

(10) Patent No.: US 8,044,713 B2
(45) Date of Patent: Oct. 25, 2011

(54) RECEIVING CIRCUIT AND METHOD FOR RECEIVING AN AMPLITUDE SHIFT KEYING SIGNAL

(75) Inventors: Ulrich Grosskinsky, Neudenau (DE); Werner Blatz, Leingarten (DE)

(73) Assignee: Atmel Corporation, San Jose, CA (US)

( * ) Notice: Subject to any disclaimer, the term of this patent is extended or adjusted under 35 U.S.C. 154(b) by 245 days.

(21) Appl. No.: 12/389,199

(22) Filed: Feb. 19, 2009

(65) Prior Publication Data

US 2009/0206925 A1 Aug. 20, 2009

Related U.S. Application Data

(60) Provisional application No. 61/030,143, filed on Feb. 20, 2008.

(30) Foreign Application Priority Data

Feb. 20, 2008 (DE) .......................... 10 2008 010 254

(51) Int. Cl.
*H04L 27/22* (2006.01)
*H03D 1/02* (2006.01)
(52) U.S. Cl. ......... 329/304; 329/348; 329/363; 375/320
(58) Field of Classification Search .................. 329/304, 329/306, 347, 348, 358, 363; 375/268, 269, 375/320
See application file for complete search history.

(56) References Cited

U.S. PATENT DOCUMENTS

| | | | | |
|---|---|---|---|---|
| 5,230,099 A | * | 7/1993 | Loper | 455/324 |
| 5,287,067 A | * | 2/1994 | Denno et al. | 329/304 |
| 5,604,929 A | * | 2/1997 | Loper et al. | 455/324 |
| 5,684,835 A | * | 11/1997 | Kroeger et al. | 375/325 |
| 5,729,575 A | * | 3/1998 | Leitch | 375/268 |
| 5,796,786 A | * | 8/1998 | Lee | 375/326 |
| 6,046,629 A | * | 4/2000 | Akiyama et al. | 329/304 |
| 2007/0194959 A1 | | 8/2007 | Rueckriem | |

FOREIGN PATENT DOCUMENTS

| | | |
|---|---|---|
| DE | 692 24 925 T2 | 4/1998 |
| DE | 10 2006 005 032 A1 | 8/2007 |
| EP | 0 496 621 B1 | 4/1998 |

* cited by examiner

*Primary Examiner* — Levi Gannon
(74) *Attorney, Agent, or Firm* — Baker Botts L.L.P.

(57) ABSTRACT

A receiving circuit and method for receiving an amplitude shift keying signal is provided. At least one exponent signal, an exponent-removed in-phase signal, and an exponent-removed quadrature-phase signal are generated from an in-phase input signal and a quadrature-phase input signal. An amplitude is determined as a sum of several summands, whereby the summands are determined from the exponent signal and/or from the exponent-removed in-phase signal and/or from the exponent-removed quadrature-phase signal (Q'), and wherein the amplitude (A) is demodulated.

14 Claims, 2 Drawing Sheets

RECEIVING CIRCUIT AND METHOD FOR RECEIVING AN AMPLITUDE SHIFT KEYING SIGNAL

This nonprovisional application claims priority to German Patent Application No. 10 2008 010 254.7, which was filed in Germany on Feb. 20, 2008, and to U.S. Provisional Application No. 61/030,143, which was filed on Feb. 20, 2008, and which are both herein incorporated by reference.

BACKGROUND OF THE INVENTION

1. Field of the Invention

The present invention relates to a receiving circuit and a method for receiving an amplitude shift keying signal and to a use.

2. Description of the Background Art

Amplitude shift keying (ASK) is also called ASK modulation. It is a type of digital modulation. Here, the amplitude of the carrier signal is changed to transmit different values, for example, a zero and a one or a word with several bits.

German Patent Application No. DE 10 2006 005 032 A1, which corresponds to U.S. Publication No. 20070194959, discloses a receiving method with digital level adjustment by a first correction factor in the analog section and an incremental level change in the digital section.

German Patent No. DE 692 24 925 T2, which corresponds to U.S. Pat. No. 5,230,099, shows a system for controlling phase and gain errors in a direct conversion I/Q receiver. In this case, I and Q baseband signal components, which are in quadrature, are generated. These signals are then independently filtered and amplified at a low frequencies on separate signal channels. The I and Q components formed as a result of the mixing process allow the signal to be conveniently demodulated. The system operates by generating new I' and Q' signals on the basis of the I and Q baseband components. The I' and Q' signals are formed so that the cos(2 phi) and sin(2 phi) correspond, where phi represents the phase angle of which the original I and Q components are a function. The I' and Q' signals are then normalized with respect to signal amplitude to produce I" and Q" signals, which are independent of amplitude effects. The thus resulting I" and Q" signals are then filtered to generate DCI and DCQ signals which correspond to their DC components. The DC components DCI and DCQ correlate with the gain and phase errors in the receiver, so that gain and phase error correction is possible. A plurality of multipliers and adders are provided for forming the correction function.

SUMMARY OF THE INVENTION

It is therefore an object of the invention to provide a receiving circuit to receive an ASK signal. Accordingly, a receiving circuit for receiving an ASK signal is provided that has a receive path in which at least one first transmission element, an evaluation logic, a summator, and a demodulator are provided.

The receiving circuit can be integrated monolithically onto a semiconductor chip.

The first transmission element can be formed to divide an in-phase input signal and a quadrature-phase input signal into a number of output signals at a number of outputs. The output signals can then be processed further separately.

In this case, the first transmission element can be formed to output an exponent signal as an output signal with a value of a base 2 exponent at an exponent output of the number of outputs. A normalization is carried out preferably to determine the exponent by determining first a leading one of the in-phase signal and/or of the quadrature-phase signal, depending on which absolute value is greater. The value of the exponent signal is then determined from the significance of the leading one.

Furthermore, the first transmission element can be formed to output an exponent-removed in-phase-signal at an in-phase output and an exponent-removed quadrature-phase signal to a quadrature-phase output of the number of outputs. The first transmission element in this case can be formed to form the absolute value of the in-phase signal and of the quadrature-phase signal. Accordingly, all vectors outside of the first quadrant of the I-Q plane are mirrored in the first quadrant. For the adjustment, preferably a mantissa is determined with a predefined accuracy after the determination of the exponent. For example, the accuracy for the exponent-removed in-phase signal and the exponent-removed quadrature-phase signal is 5 bits. The exponent is selected preferably so that I' and Q' fit precisely in the output format. For the exemplary 5 bits, the integer portion therefore is a maximum of 31. The greater value of I' and Q' is greater than or equal to 16. Alternatively, it is possible to divide the absolute values of I and Q in a parallel division by 2 until both values (as I' and Q') are less than or equal to $2^N-1$, where N is the output word length.

In addition, the receiving circuit can have a summator, for example, an adder. It has several inputs for several summands, whereby their sum is output at an output of the summator.

An evaluation logic of the receiving circuit can be connected to the summator and to the first transmission element. The evaluation logic can have a number of transmission elements, which in each case have one or more functions. In this case, the first transmission element, the evaluation logic, and the summator form a function approximating:

$$A = k \cdot \log_2(\sqrt{I^2+Q^2}) \quad (1)$$

Here, A is the amplitude, k a factor, I the in-phase signal, and Q the quadrature-phase signal.

The summator can be formed to determine an amplitude from a plurality of summands. The evaluation logic is formed to determine a plurality of summands from the exponent signal, from the exponent-removed in-phase signal, and from the exponent-removed quadrature-phase signal. The determined amplitude here is approximated to the actual physically transmitted signal amplitude. Preferably, the amplitude is represented on a logarithmic scale. The evaluation logic can be formed to determine one or more summands by forming a base 2 logarithm, whereby the function comprises the exponent-removed in-phase signal and the exponent-removed quadrature-phase signal.

The amplitude here can be determined from the exponent signal, from the exponent-removed in-phase signal, and from the exponent-removed quadrature-phase signal. In addition, advantageously one or more additional signals, for example, a control signal assigned to amplifying a controllable input amplifier, are added by the summator to determine the amplitude.

A decision circuit for the amplitude shift keying can be connected downstream of an output of the summator in the receive path. The decision circuit can also be called an evaluation circuit. The decision circuit can be formed in such a way that the output signal of the summator is compared with a threshold value. Preferably, the output signal of the summator is filtered beforehand. Further, the threshold value can be determined from the output signal of the summator by averaging.

A method for receiving an ASK signal is also provided.

At least one exponent signal, an exponent-removed in-phase signal, and an exponent-removed quadrature-phase signal can be generated from the received in-phase input signal and a received quadrature-phase input signal.

An amplitude can be determined as a sum of several summands. The summands are determined from the exponent signal and/or from the exponent-removed in-phase signal and/or from the exponent-removed quadrature-phase signal.

The amplitude can then be evaluated. For example, to this end, the amplitude is compared with a threshold value. This can be fixedly predefined, for example, or calculated from the amplitude itself, for example, by a low-pass function.

A use of an exponent-removed in-phase signal and an exponent-removed quadrature-phase signal of amplitude shift keying is also provided for determining an amplitude and for the demodulation of amplitude shift keying.

In an embodiment, the evaluation logic of the receiving circuit has a second transmission element, which is connected to the in-phase output and the quadrature-phase output of the first transmission element.

The second transmission element can be formed to output the exponent-removed in-phase signal at its first output, when the exponent-removed quadrature-phase signal is smaller than the exponent-removed in-phase signal.

The second transmission element can be formed, in addition, to output the exponent-removed quadrature-phase signal at its first output, when the exponent-removed in-phase signal is smaller than the exponent-removed quadrature-phase signal.

Furthermore, the second transmission element can be formed to output the exponent-removed quadrature-phase signal at its second output, when the exponent-removed quadrature-phase signal is smaller than the exponent-removed in-phase signal.

Furthermore, the second transmission element can be formed in addition to output the exponent-removed in-phase signal at its second output, when the exponent-removed in-phase signal is smaller than the exponent-removed quadrature-phase signal.

If the value of the exponent removed in-phase signal corresponds to that of the exponent-removed quadrature-phase signal, the same value is output at the first output and at the second output.

The second transmission element can have a comparator and a multiplexer. The multiplexer is preferably controlled depending on a comparator's comparison result. An input of the comparator is connected in each case to an input of the second transmission element. The comparator thereby compares simultaneous values of the exponent-removed in-phase signal and of the exponent-removed quadrature-phase signal. According to the previously described conditions, the multiplexer can be controlled to switch the exponent-removed in-phase signal and/or the exponent-removed quadrature-phase signal to the corresponding output.

According to another embodiment, the evaluation logic has a third transmission element. The third transmission element is formed for an arc tangent function (atan). In this case, the third transmission element is formed to output an approximate arc tangent value at its output for substantially simultaneous values of the exponent-removed in-phase signal and of the exponent-removed quadrature-phase signal.

To this end, the inputs of the third transmission element can be connected to the first output and to the second output of the second transmission element. Accordingly, the larger or equal signal from the exponent-removed in-phase signal and quadrature-phase signal can be applied at a first input of the third transmission element, which is connected to the first output of the second transmission element. In contrast, the smaller or equal signal from the exponent-removed in-phase signal and quadrature-phase signal can be applied at a second input of the third transmission element, which is connected to the second output of the second transmission element.

In an embodiment, the evaluation logic can have a fourth transmission element. The input of the fourth transmission element can be connected to an output of the third transmission element. The fourth transmission element is formed to determine an approximate value of the base 2 logarithm of the square root of the sum of 1 and the square of the tangent from the output signal of the third transmission element. For example, the function can be calculated precisely by a computational operation.

A further embodiment, provides that the fourth transmission element for determining the approximate value can have a table with output values assigned to the output signal values of the third transmission element. For example, each input value can be assigned precisely an output value in the table. Alternatively, the table contains data points, whereby input values between the data points are determined by linear interpolation or assigned to a next data point. The accuracy of the transmission function of the fourth transmission element can be set depending on the number of sampling points and the rounding off of the input values.

An output of the fourth transmission element can be connected to an input of the summator.

Another embodiment provides that the evaluation logic can have a fifth transmission element. An input of the fifth transmission element is connected to the first output of the second transmission element. An output of the second transmission element is connected to an input of the summator. The fifth transmission element can be formed to output an approximate value of the base 2 logarithm of the input value.

In an embodiment, the first transmission element is formed to output a quadrant signal as an output signal with a value for each quadrant of the unit circle at a quadrant output of the number of outputs. The respective quadrant in this case is established by the sign of the in-phase signal and of the quadrature-phase signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
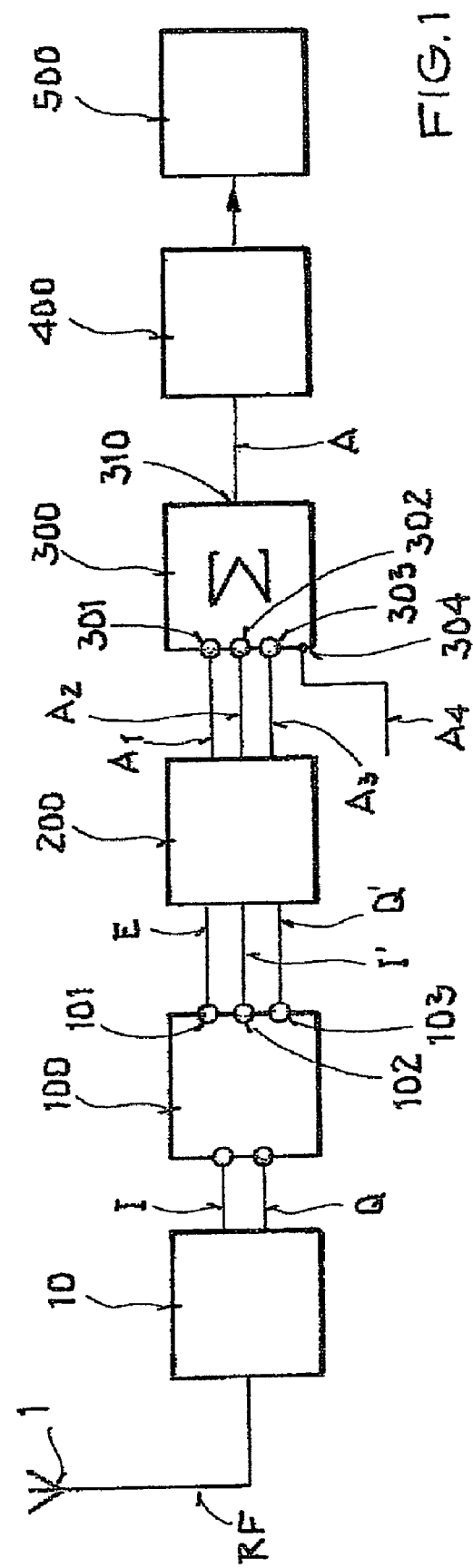
FIG. 1 shows a first exemplary embodiment of a receiving circuit.

A receiving circuit is shown schematically by a block diagram in FIG. 1. In this case, an incoming signal RF is received over an antenna 1. Alternatively to antenna 1, a cable connection or an optical conductor could also be provided. The incoming signal in the receive path first reaches an input circuit 10. In this case, in the receive path, all circuit parts are arranged to influence, process, or evaluate the incoming signal. Input circuit 10, for example, has an analog amplifier, a local oscillator, an analog mixer for downmixing the incoming signal RF to an intermediate frequency signal, analog filters, digital filters, and an analog-to-digital converter.

An in-phase input signal I and a quadrature-phase input signal Q are output at the outputs of input circuit 10. The digital in-phase input signal I and the digital quadrature-phase input signal Q are applied at the inputs of a first transmission element 100 in the receive path. The first transmission element, moreover, has three outputs 101, 102, and 103, which are connected to inputs of an evaluation logic 200.

The first transmission element 100 serves to divide an in-phase input signal I and a quadrature-phase input signal Q into a number of output signals E, I', Q'. These output signals E, I', Q' are output at a number of outputs 101, 102, 103. First transmission element 100 is formed to output an exponent signal E as an output signal with a value of a base 2 exponent at an exponent output 101. The exponent signal E is determined, for example, by normalization of the in-phase input signal I and of the quadrature-phase input signal Q for a floating-point number with the same base 2 exponent.

Furthermore, first transmission element 100 is formed to output an exponent-removed in-phase signal I' at an in-phase output 102 and an exponent-removed quadrature-phase signal Q' at a quadrature-phase output 103 of the number of outputs. With identical exponents, during the adjustment the mantissas I' and Q' of the in-phase input signal I and of the quadrature-phase input signal Q remain. The resolution of the mantissas I' and Q' is advantageously predefined as the exponent-removed in-phase signal I and the exponent-removed quadrature-phase signal Q', so that the computing time for subsequent digital computations can be advantageously reduced. The division into exponent signal E and mantissas I' and Q' has the surprising effect that the calculation of vectors in the I-Q plane is substantially simplified computationally by a reduction of the bit width. First transmission element 100 passes on only the absolute values of the signed signals I and Q, because the signs for the amplitude determination are not needed in the exemplary embodiment of FIG. 1. In addition, the signs can be output via output 104 for frequency shift keying (FSK).

Inputs 301, 302, 303 of a summator 300 are connected to the outputs of evaluation logic 200. The summator can also be called an adder. The summator outputs at its output 310 a composite signal, which represents the amplitude A. To this end, the individual summand signals A1, A2, A3, and A4 are added at inputs 301, 302, 303, and 304 of summator 300. In the exemplary embodiment of FIG. 1, the summand A4 is not provided by evaluation logic 200. The summand A4 is determined, for example, from a control signal to control an analog amplification of the incoming signal RF in input circuit 10 or corresponds to this signal. Accordingly, evaluation logic 200 and summator 300 are formed to determine the amplitude A at least from the exponent signal E, from the exponent-removed in-phase signal I', and from the exponent-removed quadrature-phase signal Q'.

In the receive path, a decision circuit 400 is connected to output 310 of summator 300 for amplitude shift keying. The demodulated signals can be evaluated in a subsequent arithmetic unit 500 particularly with respect to the data content.

Figure 2:
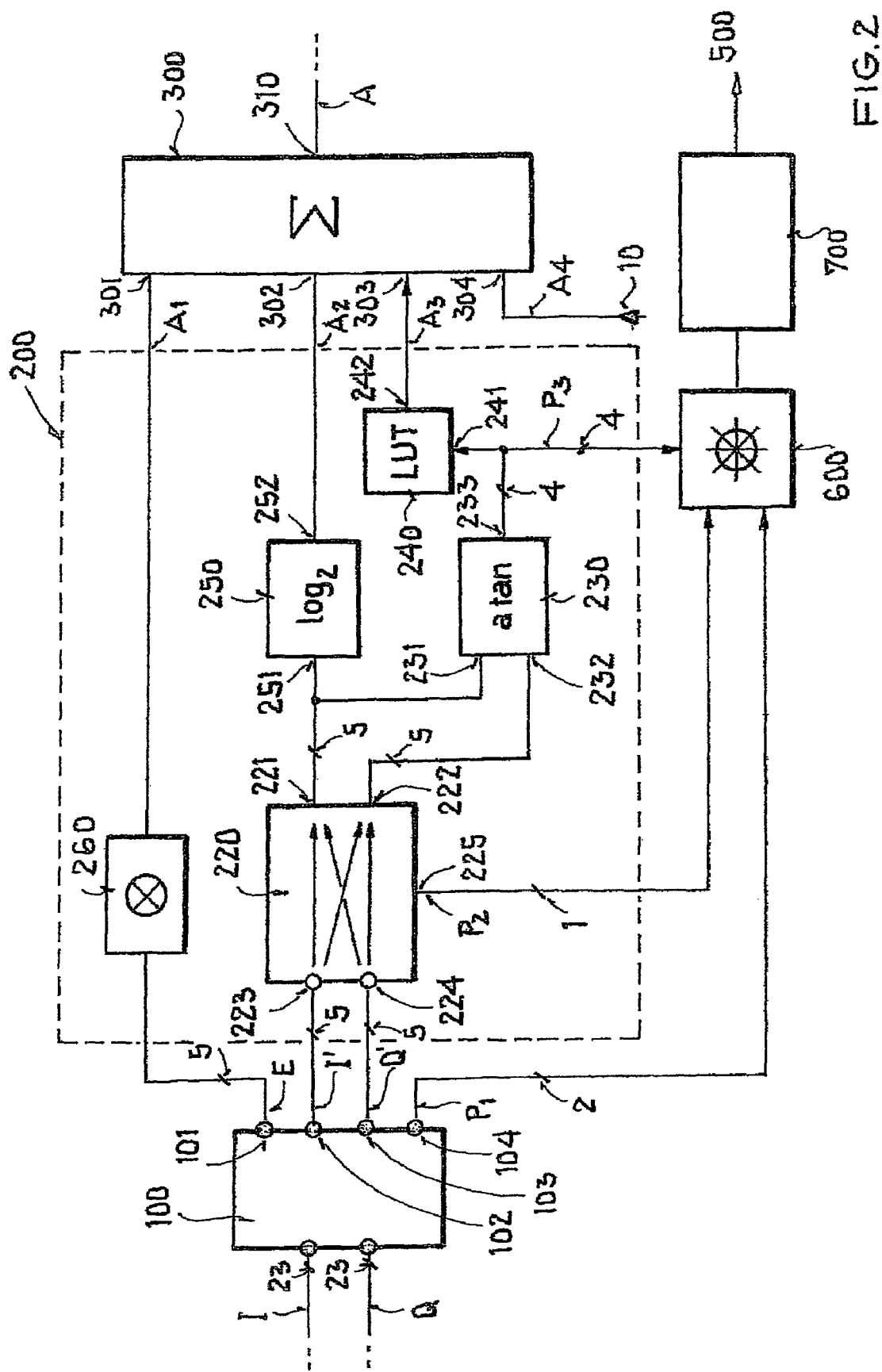
FIG. 2 shows a second exemplary embodiment of a receiving circuit.

Another exemplary embodiment is shown schematically as a block diagram in FIG. 2. First transmission element 100, evaluation logic 200, and summator 300 are again provided. In this case, a desired output signal A of summator 300 should be approximated to the function $$A = k \cdot \log_2(\sqrt{I^2 + Q^2}) \quad (1)$$

Here, A is the amplitude, k a factor, I the in-phase signal, and Q the quadrature-phase signal. In the exemplary embodiment of FIG. 2, the signs of the in-phase signal I and the quadrature-phase signal are not needed to determine the signal A. The signs are therefore removed in first transmission element 100. A power of 2 (e.g., 16 or 32) is selected advantageously for the factor k, so that transmission element 260 is simple to realize.

The inputs of first transmission element 100 in the exemplary embodiment of FIG. 2 each have a bit width of 23 bits. Depending on the receiver, other bit widths may also be provided. In addition, as indicated by way of example in FIG. 1, other circuit parts may be provided. Evaluation logic 200 has a second transmission element 220, a third transmission element 230, a fourth transmission element 240, a fifth transmission element 250, and a sixth transmission element 260. In other embodiments, individual transmission elements of evaluation logic 200 can also be omitted or replaced by other transmission elements.

In first transmission element 100, a normalization occurs first, by means of which the in-phase signal I and the quadrature-phase signal Q are separated from an exponent E, so that the following applies:

$$I' = \frac{|I|}{2^E} \text{ and } Q' = \frac{|Q|}{2^E} \quad (2)$$

If this is used in formula (I), it follows that:

$$A = k \cdot \lfloor E + \log_2(\sqrt{I'^2 + Q'^2}) \rfloor \quad (3)$$

The amplitude A in this case is output in a base 2 logarithmic form. Advantageously, evaluation logic 200 is formed to determine one or more summands A1, A2 by means of function (3). In function (3), A is the amplitude, k a factor, E the exponent signal, I' the exponent-removed in-phase signal, and Q' the exponent-removed quadrature-phase signal.

A first input 223 of second transmission element 220 is connected to in-phase output 102 of first transmission element 100. A second input 224 of second transmission element 220 is connected to quadrature-phase output 103 of first transmission element 100. Both connections in the exemplary embodiment of FIG. 2 have a bit width, for example, of 5 bits. Depending on the desired resolution, a higher or lower bit width can also be used. Second transmission element 220 has a first output 221 and a second output 222.

The function of second transmission element 220 is to output at the first output the signal that is larger in terms of the absolute value of the exponent-removed in-phase signal I' and the exponent-removed quadrature-phase signal Q', and at the second output the signal that is smaller in terms of the absolute value of the exponent-removed in-phase signal I' and the exponent-removed quadrature-phase signal Q'. If both signals I', Q' have the same value, the output value at the first output and the second output is identical.

Therefore, the following applies:

$$a = I' b = Q', \text{ when } I' > Q' \quad (4)$$

$$a = Q' b = I', \text{ when } I' < Q' \quad (5)$$

In this case, the value a is output at output 221 and the value b at output 222. Any assignment can be selected for I'=Q'. When used in formula (3), the following results:

$$A = k \cdot [E + \log_2(\sqrt{a^2 + b^2})] \quad (6)$$

Accordingly, the larger signal arrives at a first input 231 of a third transmission element 230 from the first output of second transmission element 220. Furthermore, this signal arrives at an input 251 of a fifth transmission element 250. Second output 222 of second transmission element 220 is connected to a second input 232 of third transmission element 230. Third transmission element 230 has an arc tangent function. In this case, third transmission element 230 forms an arc tangent value from the value of the signal at first input 231 to the value of the signal at second input 232, whereby the value at first input 231 is always greater or equal to the value at second input 232.

Third transmission element 230 therefore determines an angle φ, which is output as signal P3. Here, the following applies:

$$\varphi = \arctan\left(\frac{b}{a}\right) \quad (7)$$

In this case, 0°≦φ≦45°, because a≧b and a≧0, b≧0.

Here, the exemplary embodiment of FIG. 2 shows the surprising effect of how efficiently the symmetry of the arc tangent function, or the arc cotangent function, can be used for a simple calculation by suitable data analysis.

If the length of a vector in the I-Q plane is to be determined, the vector is shortened even in the first transmission element by the exponent, whereby the exponent in a sixth transmission element 260 is multiplied by a factor and supplied as summand A1 to first input 301 of summator 300. Furthermore, the vector in the I-Q plane is adjusted by the sign by mirroring all vectors in the first quadrant. The exponent is shown in the exemplary embodiment of FIG. 2 with a resolution of 5 bits. If the remaining vector is broken down into its I' and Q' components, in second transmission element 220 the larger component of I' and Q' is determined first and output at output 221. For this signal of the larger component of I' and Q', the base 2 logarithm is then determined in the fifth transmission element and output at output 252 of fifth transmission element 250 as second summand A2 to input 302 of summator 300.

Here, $$A2 = k \cdot \log_2(a) \text{ and } A1 = k \cdot E \quad (8)$$

The arc tangent value output at output 233 of third transmission element 230 has a resolution of 4 bits. Output 233 of third transmission element 230 is connected to input 241 of fourth transmission element 240. Fourth transmission element 240 is formed advantageously to determine an approximate value of the base 2 logarithm of the square root of the sum of 1 and the square of the tangent from the output signal of third transmission element 230.

Therefore, the following applies:

$$A3 = k \cdot \log_2(\sqrt{1 + \tan^2 \varphi}) \quad (9)$$

Whereby φ from formula (7) can be used here.

Based on the bit width of 4 bits in the exemplary embodiment of FIG. 2, 16 different values can be applied at the input of the fourth transmission element. For a simple realization, a lookup table (LUT) with 16 output values is therefore provided for the 16 input values. The output signal of fourth transmission element 240 is applied as third summand A3 at a third input 303 of summator 300.

Accordingly, the following function applies for the exemplary embodiment of FIG. 2:

$$A + A1 + A2 + A3 = k \cdot E + k \cdot \log_2(a) + k \cdot \log_2\left(\sqrt{1 + \frac{b^2}{a^2}}\right) \quad (10)$$

Advantageously, evaluation logic 200 is formed to determine one or more summands A1, A2, A3 by means of function (10). In this case, A is the amplitude, A1, A2, A3 the summands, k a factor, E the exponent signal, I' the exponent-removed in-phase signal, and Q' the exponent-removed quadrature-phase signal. A considerable simplification of the hardware, compared with a conversion of function (3), is achieved in this way.

If in addition to amplitude shift keying, demodulation for frequency shift keying is performed, the receiving circuit, as shown in the exemplary embodiment of FIG. 2, can be supplemented by other function blocks. Transmission element 600 combines several phase signals P1, P2, P3 into a phase signal that is demodulated in the frequency demodulator (FSK demodulator) 700, for example, by means of a digital PLL. First transmission element 100 in this case provides by means of 2 bits the information P1 in regard to the quadrant. A bit of the second transmission element 220 provides the information P2 in regard to one octant of the two octants of the determined quadrants. The octant is again divided by the 4-bit-long signal P3 into 15 angles or 16 angles. As a result, a resolution of a maximum of 360°/120=3° and/or 360°/128=2.8125° can be achieved.

The invention is not limited to the shown embodiment variants in FIG. 1 or 2. For example, it is possible to omit frequency shift keying. It is also possible to provide a different logic, for example, a calculation from the signals E, I', and Q' by means of algorithms, instead of the evaluation logic shown in FIG. 2. It is also theoretically possible to provide an analog circuit with analog circuit blocks 100, 200, and 300 instead of the digital circuit. The indicated bit widths are only examples and depend on the accuracy requirements and the dynamics of the system.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving circuit for receiving an amplitude shift keying signal, the receiving circuit comprising:
   a first transmission element configured to divide an in-phase input signal and a quadrature-phase input signal into a plurality of output signals at a plurality of outputs;
   a summator configured to determine an amplitude as a sum of a plurality of summands; and
   an evaluation logic connectable to the summator and the first transmission element,
   wherein the first transmission element is configured to output an exponent signal as an output signal with a value of a base 2 exponent at an exponent output of the plurality of outputs,
   wherein the first transmission element is configured to output an exponent removed in-phase signal at an in-phase output and an exponent-removed quadrature-phase signal at a quadrature-phase output of the plurality of outputs, and wherein the evaluation logic is configured to determine the plurality of summands from the exponent signal from the exponent-removed in-phase signal and from the exponent-removed quadrature-phase signal.

2. The receiving circuit according to claim 1, wherein the evaluation logic is configured to determine one or more of the plurality of summands by forming a base 2 logarithm from a function with the exponent-removed in-phase signal and exponent-removed quadrature-phase signal.

3. The receiving circuit according to claim 1, wherein the evaluation logic determines one or more of the plurality of summands by the function:

$$A = A_1 + A_2 = k \cdot E + \log_2(\sqrt{I'^2 + Q'^2})$$

and wherein A is the amplitude, A1, A2, A3 the summands, k a factor, E the exponent signal, I' the exponent-removed in-phase signal, and Q' the exponent-removed quadrature-phase signal.

4. The receiving circuit according to claim 1, wherein the evaluation logic determines one or more of the plurality of summands by the function $$A + A1 + A2 + A3 = k \cdot E + k \cdot \log_2(a) + k \cdot \log_2\left(\sqrt{1 + \frac{b^2}{a^2}}\right)$$

wherein a=I'b=Q', when I'>Q' and a=Q'b=I', when I'<Q', and wherein A is the amplitude, A1, A2, A3 the summands, k a factor, E the exponent signal, I' the exponent-removed in-phase signal, and Q' the exponent-removed quadrature-phase signal.

5. The receiving circuit according to claim 1, wherein the evaluation logic comprises a second transmission element, which is connected to the in-phase output and the quadrature-phase output of the first transmission element, wherein the second transmission element is configured to output the exponent-removed in-phase signal at its first output when the exponent-removed quadrature-phase signal is smaller than the exponent-removed in-phase signal and is configured to output the exponent-removed quadrature-phase signal when the exponent-removed in-phase signal is smaller than the exponent-removed quadrature-phase signal, and wherein the second transmission element is configured to output the exponent-removed quadrature-phase signal at its second output when the exponent-removed quadrature-phase signal is smaller than the exponent-removed in-phase signal, and is configured to output the exponent-removed in-phase signal when the exponent-removed in-phase signal is smaller than the exponent-removed quadrature-phase signal.

6. The receiving circuit according to claim 5, wherein the evaluation logic comprises a third transmission element, wherein the third transmission element is configured for an arc tangent function to output an approximate arc tangent value from the exponent-removed in-phase signal and the exponent-removed quadrature-phase signal as input values.

7. The receiving circuit according to claim 6 wherein the inputs of the third transmission element are connected to the first output and to the second output of the second transmission element.

8. The receiving circuit according to claim 6, wherein the evaluation logic further comprises a fourth transmission element, whose input is connected to an output of the third transmission element, wherein the fourth transmission element is formed to determine an approximate value of the base 2 logarithm of the square root of the sum of 1 and the square of tangent from the output of the third transmission element.

9. The receiving circuit according to claim 8, wherein the fourth transmission element for determining the approximate value has a table with output value assigned to the output signal values of the third transmission element.

10. The receiving circuit according to claim 9, wherein an output of the fourth transmission element is connected to an input of the summator.

11. The receiving circuit according to claim 8, wherein the evaluation logic has a fifth transmission element, whose input is connected to the first output of the second transmission element and whose output is connected to an input of the summator, and wherein the fifth transmission element is configured to output an approximate value of the base 2 logarithm of the input value.

12. The receiving circuit according to claim 1 wherein the first transmission element is configured to output a quadrant signal as an output signal with a value for each quadrant of a unit circle at a quadrant output of the plurality of outputs.

13. A method for receiving an amplitude shift keying signal, the method comprising:
generating at least one exponent signal, an exponent-removed in-phase signal, and an exponent-removed quadrature-phase signal from an in-phase input signal and a quadrature-phase input signal;
determining an amplitude as a sum of several summands, the summands being determined from the exponent signal and from the exponent-removed in-phase signal and from the exponent-removed quadrature-phase signal; and
demodulating the amplitude.

14. A method for determining an amplitude, the method comprising:
receiving and dividing an in-phase signal and a quadrature-phase signal;
outputting an exponent removed in-phase signal;
outputting an exponent removed quadrature-phase signal;
outputting an exponent signal having a value of a base 2 exponent; and
determining an amplitude as a sum of several summands, the summands being determined from the exponent signal and from the exponent-removed in-phase signal and from the exponent-removed quadrature-phase signal.

* * * * *

UNITED STATES PATENT AND TRADEMARK OFFICE
CERTIFICATE OF CORRECTION

| | | |
|---|---|---|
| PATENT NO. | : 8,044,713 B2 | Page 1 of 1 |
| APPLICATION NO. | : 12/389199 | |
| DATED | : October 25, 2011 | |
| INVENTOR(S) | : Ulrich Grosskinsky | |

It is certified that error appears in the above-identified patent and that said Letters Patent is hereby corrected as shown below:

In the Claims

Claim 4, Col. 9, Ln. 26: After "A" and before "A1" delete "+" and insert -- = --.

Signed and Sealed this
Fourteenth Day of October, 2014

Michelle K. Lee
*Deputy Director of the United States Patent and Trademark Office*